US007865640B1

(12) United States Patent
Lewis et al.

(10) Patent No.: US 7,865,640 B1
(45) Date of Patent: Jan. 4, 2011

(54) USB WEB LAUNCHER USING KEYBOARD SCANCODES

(75) Inventors: Edward D. Lewis, Brownsburg, IN (US); Edward Schmitt, Williamsburg, MI (US); Christopher A. Webber, Greenwood, IN (US)

(73) Assignee: Buztronics, Inc., Indianapolis, IN (US)

( * ) Notice: Subject to any disclaimer, the term of this patent is extended or adjusted under 35 U.S.C. 154(b) by 67 days.

(21) Appl. No.: 11/968,646

(22) Filed: Jan. 2, 2008

(51) Int. Cl.
*G06F 13/12* (2006.01)
*G06F 13/38* (2006.01)

(52) U.S. Cl. .......................... 710/62; 710/67; 710/305; 713/340

(58) Field of Classification Search ............... 710/67
See application file for complete search history.

(56) References Cited

U.S. PATENT DOCUMENTS

| 5,305,449 | A | | 4/1994 | Ulenas |
| 5,777,903 | A | | 7/1998 | Piosenka et al. |
| 5,954,808 | A | | 9/1999 | Paul |
| 6,037,928 | A | | 3/2000 | Nachinson et al. |
| 6,104,295 | A | * | 8/2000 | Gaisser et al. ........... 340/573.4 |
| 6,115,823 | A | * | 9/2000 | Velasco et al. ............... 713/322 |
| 6,178,514 | B1 | * | 1/2001 | Wood .......................... 713/300 |
| 6,292,863 | B1 | * | 9/2001 | Terasaki et al. ............. 710/313 |
| 6,445,381 | B1 | | 9/2002 | Chou |
| 6,633,998 | B1 | * | 10/2003 | Lau .............................. 714/22 |
| 6,768,483 | B1 | | 7/2004 | Nachinson et al. |
| 6,834,294 | B1 | * | 12/2004 | Katz ........................... 709/203 |
| 6,888,322 | B2 | | 5/2005 | Dowling et al. |
| 6,895,589 | B2 | | 5/2005 | Bermudez et al. |
| 6,941,114 | B1 | | 9/2005 | Kuo et al. |
| D511,017 | S | | 10/2005 | Chang |
| 6,986,030 | B2 | | 1/2006 | Shmueli et al. |
| 6,993,618 | B2 | * | 1/2006 | Chen et al. ................... 710/305 |

(Continued)

OTHER PUBLICATIONS

Universal Serial Bus Specification, Rev. 2.0, Apr. 27, 2000, Compaq Computer Corporation, Hewlett-Packard Company, Intel Corporation, Lucent Technologies Inc., Microsoft Corporation, NEC Corporation, Koninklijke Philips Electronics N.V., 650 pgs.

(Continued)

*Primary Examiner*—Henry W Tsai
*Assistant Examiner*—Christopher A Bartels
(74) *Attorney, Agent, or Firm*—William F. Bahret

(57) ABSTRACT

A USB web launcher for launching a browser on a host computer and directing the browser to a website specified by the web launcher. The USB web launcher comprises a housing, and a controller within the housing which is configured to operate as a USB HID keyboard device. The controller has a URL stored therein in the form of a keyboard scancode string and is programmed to send the keyboard scancode string to the host computer in response to actuation of a switch on the housing. The web launcher includes USB connector means for coupling the controller to a USB port of the host computer, and, in response to the transmitted URL, the host computer launches the browser and accesses the corresponding website. One embodiment of the invention is a USB web launcher having first and second USB connector parts and a lanyard mode of operation in which the controller within the web launcher is programmed to recognize when the first and second USB connector parts are interconnected and to energize an LED in response.

14 Claims, 6 Drawing Sheets

U.S. PATENT DOCUMENTS

| | | | |
|---|---|---|---|
| 7,038,665 B1 | 5/2006 | Pandana | |
| 7,125,287 B1* | 10/2006 | Chou et al. | 439/660 |
| 7,126,559 B2 | 10/2006 | Su et al. | |
| 7,629,963 B1* | 12/2009 | Wright | 345/168 |
| 7,657,290 B2* | 2/2010 | Veselic et al. | 455/572 |
| 2001/0024189 A1 | 9/2001 | Michie | |
| 2002/0002490 A1 | 1/2002 | Gerpheide | |
| 2002/0084986 A1* | 7/2002 | Armstrong | 345/163 |
| 2003/0161193 A1* | 8/2003 | Moran et al. | 365/200 |
| 2003/0204654 A1* | 10/2003 | Nathan | 710/67 |
| 2003/0208404 A1 | 11/2003 | Michie | |
| 2003/0221029 A1* | 11/2003 | Wang et al. | 710/67 |
| 2004/0087213 A1 | 5/2004 | Kao | |
| 2004/0145890 A1 | 7/2004 | Liao | |
| 2004/0156192 A1 | 8/2004 | Kerr et al. | |
| 2006/0020736 A1* | 1/2006 | Jackson | 710/313 |
| 2006/0028433 A1 | 2/2006 | Myrick | |
| 2006/0036872 A1* | 2/2006 | Yen | 713/183 |
| 2006/0047880 A1* | 3/2006 | Lindblom et al. | 710/305 |
| 2006/0132447 A1* | 6/2006 | Conrad | 345/168 |
| 2006/0133064 A1 | 6/2006 | Lin | |
| 2006/0205507 A1 | 9/2006 | Ho | |
| 2006/0224791 A1* | 10/2006 | Keppeler | 710/62 |
| 2006/0244833 A1 | 11/2006 | Abe et al. | |
| 2006/0294283 A1 | 12/2006 | Tong | |
| 2007/0016957 A1* | 1/2007 | Seaward et al. | 726/26 |
| 2007/0032136 A1 | 2/2007 | Sheng et al. | |
| 2007/0055802 A1* | 3/2007 | Hsu | 710/67 |
| 2007/0088876 A1* | 4/2007 | Chen | 710/67 |
| 2008/0012823 A1* | 1/2008 | Radecki | 345/156 |
| 2008/0052439 A1* | 2/2008 | Young et al. | 710/305 |
| 2008/0111521 A1* | 5/2008 | So et al. | 320/137 |
| 2008/0177907 A1* | 7/2008 | Boerger et al. | 710/15 |
| 2008/0294923 A1* | 11/2008 | Barake et al. | 713/330 |
| 2008/0313370 A1* | 12/2008 | Kang et al. | 710/67 |
| 2009/0100144 A1* | 4/2009 | Sullivan et al. | 709/217 |
| 2009/0106464 A1* | 4/2009 | Cavill et al. | 710/64 |
| 2009/0138637 A1* | 5/2009 | Hargreaves et al. | 710/67 |
| 2009/0172219 A1* | 7/2009 | Mardiks | 710/67 |

OTHER PUBLICATIONS

Sinotech Web Key, c. 2005, 1 pg.
Cypress Semiconductor Corp., WirelessUSB™ LP Reference Design Kit, Jun. 12, 2006, 1 pg.
Griffin PowerMate USB Multimedia Controller & Input Device—1040-PMT, c. 2006, retrieved online from Buy.com, 3 pgs.
Strassberg, Dan, "Low-cost USB data-acquisition modules include instrument-panel software," *EDN*, Mar. 31, 2005, 1 pg.
Saltzman, Marc, "Reveling in Retro," *The Indianapolis Star*, Oct. 1, 2006, 2 pgs.
Press Release, "IOGEAR Launches 5-Button USB Laser Mouse," Aug. 2005, 1 pg.
Press Release, "IOGEAR Launches Industry's First 5-Button USB Laser Mouse," Aug. 22, 2005, 1 pg.
Faasse, James, "Turning Browsers into Buyers," [online], Aug. 25, 2006, [retrieved Jan. 24, 2007]. Retrieved from the Internet: http://www.inetready.com/blogger/index.htm, 3 pgs.
USB iWebKey Response System, [online], undated, [retrieved Jan. 24, 2007]. Retrieved from the Internet: http://iwebkey.com/#, 1 pg.
ePromos Promotional Products Promotional Items Inc., Web Key Website Launcher Keychain, [online], © 1998-2005, [retrieved Jan. 24, 2007]. Retrieved from the Internet: http://www.epromos.com/product/8820395.html, 2 pgs.
Web Key K5, [online], undated, [retrieved Jan. 24, 2007]. Retrieved from the Internet: http://www.allinoneline.com/ProductDetails.aspx?productID=345, 1 pg.
"Scancode," from Wikipedia, 2 pgs.
"PC Keyboard Scan Codes," [online], Jan. 2003. Retrieved from the Internet: http://www.barcodeman.com/altek/mule/scandoc.php, 6 pgs.
"USB Device classes," from Wikipedia, 1 pg.
Clegg Industries, Lighted Morphing Dome Hub, © 2005, 1 pg.
Clegg Industries, Lighted Color Changing Mug Warmer, © 2005, 1 pg.
Savant Elite Programmable Triple Action Footswitch, USB, c. 2006, retrieved online from askErgoWorks.com, 1 pg.
Syba USB VoIP Controller, c. 2006, retrieved online from Meritline.com, 1 pg.
Logitech Precision Game Pad USB—PC/Mac—96335-0403, c. 2006, retrieved online from Buy.com, 1 pg.
NIB Konami Plug & Play Frogger TV Arcade Cool, c. 2006, retrieved online from ebay.com, 1 pg.
USB Flash Drive—Style Bracelet, c. 2006, retrieved online from iPromo.com, 2 pgs.
USB Lanyard—Data Band, c. 2006, retrieved online from iPromo.com, 2 pgs.
USB Watch USB5009, c. 2006, retrieved online from usb-choice.com, 1 pg.
Axelson, Jan, "USB Complete: Everything You Need to Develop USB Peripherals," 3$^{rd}$ Edition, Lakeview Research LLC, Publishers, Madison, WI, © 1999-2005, Cover, copyright page, pp. 85-116, 203-206, 319-331.
Web Keys, All in One 20$^{th}$ Anniversary, c.2007, p. 47.
Cypress Semiconductor Corporation, Cypress CY7C638xx enCoRe™ II Low-Speed USB Peripheral Controller Data Sheet, Sep. 26, 2006, 74 pages.
Allman, Stuart, "Using the HID Class Eases the Job of Writing USB Device Drivers," *EDN*, Sep. 19, 2002, pp. 83-90.
Griffin PowerMate Instruction Manual, © 2002, Griffin Technology, Inc., Nashville, TN, 12 pgs.
Universal Serial Bus (USB) Device Class Definition for Human Interface Devices (HID), Version 1.11, Jun. 27, 2001, USB Implementers' Forum, 97 pgs.
Universal Serial Bus (USB) HID Usage Tables, Version 1.11, Jun. 27, 2001, USB Implementers' Forum, 159 pgs.

* cited by examiner

US 7,865,640 B1

USB WEB LAUNCHER USING KEYBOARD SCANCODES

BACKGROUND OF THE INVENTION

This invention relates to web launchers and, more particularly, to a web launch device adapted to connect to a USB port of a host computer.

SUMMARY OF THE INVENTION

The present invention provides a USB web launcher for launching a browser on a host computer and directing the browser to a website specified by the web launcher. The USB web launcher comprises a housing, a controller within the housing having a URL stored therein, USB connector means for coupling the controller to a USB port of the host computer, and a manual switch mounted on the housing and electrically connected to an input of the controller, the controller being configured to send the stored URL to the host computer in response to actuation of the manual switch, whereby the host computer launches the browser and accesses the corresponding website.

Another aspect of the invention is a USB web launcher having first and second USB connector parts and a lanyard mode of operation in which a controller within the web launcher is programmed to recognize when the first and second USB connector parts are interconnected and to energize an LED in response.

The objects and advantages of the present invention will be more apparent upon reading the following detailed description in conjunction with the accompanying drawings.

DETAILED DESCRIPTION OF PREFERRED EMBODIMENTS

Figure 1:
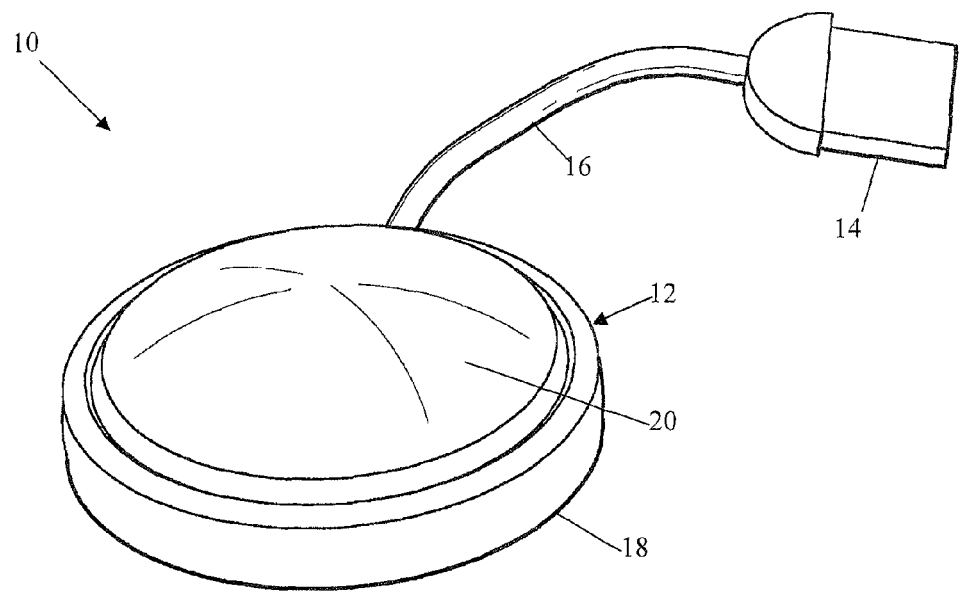
FIG. 1 is a perspective view of a first embodiment of a USB web launcher according to the present invention, in the form of a circular housing with a pushbutton dome and a cable connection to a USB plug for insertion into the USB port of a host computer.

For the purpose of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device and such further applications of the principles of the invention as illustrated therein being contemplated as would normally occur to one skilled in the art to which the invention relates.

Figure 2:
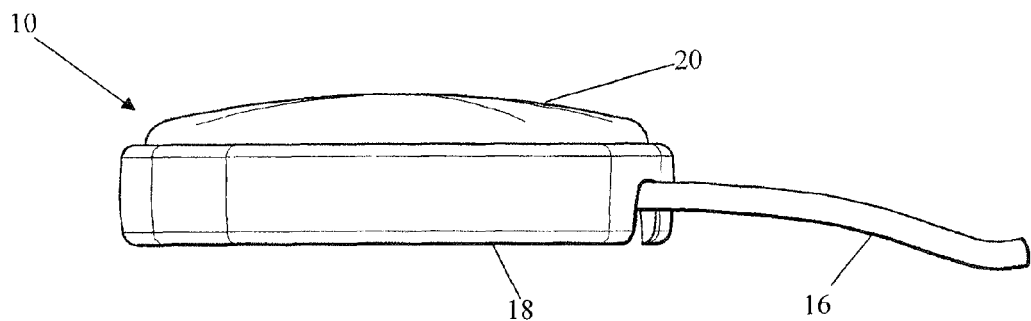
FIG. 2 is a side view of the USB web launcher of FIG. 1.
Figure 3:
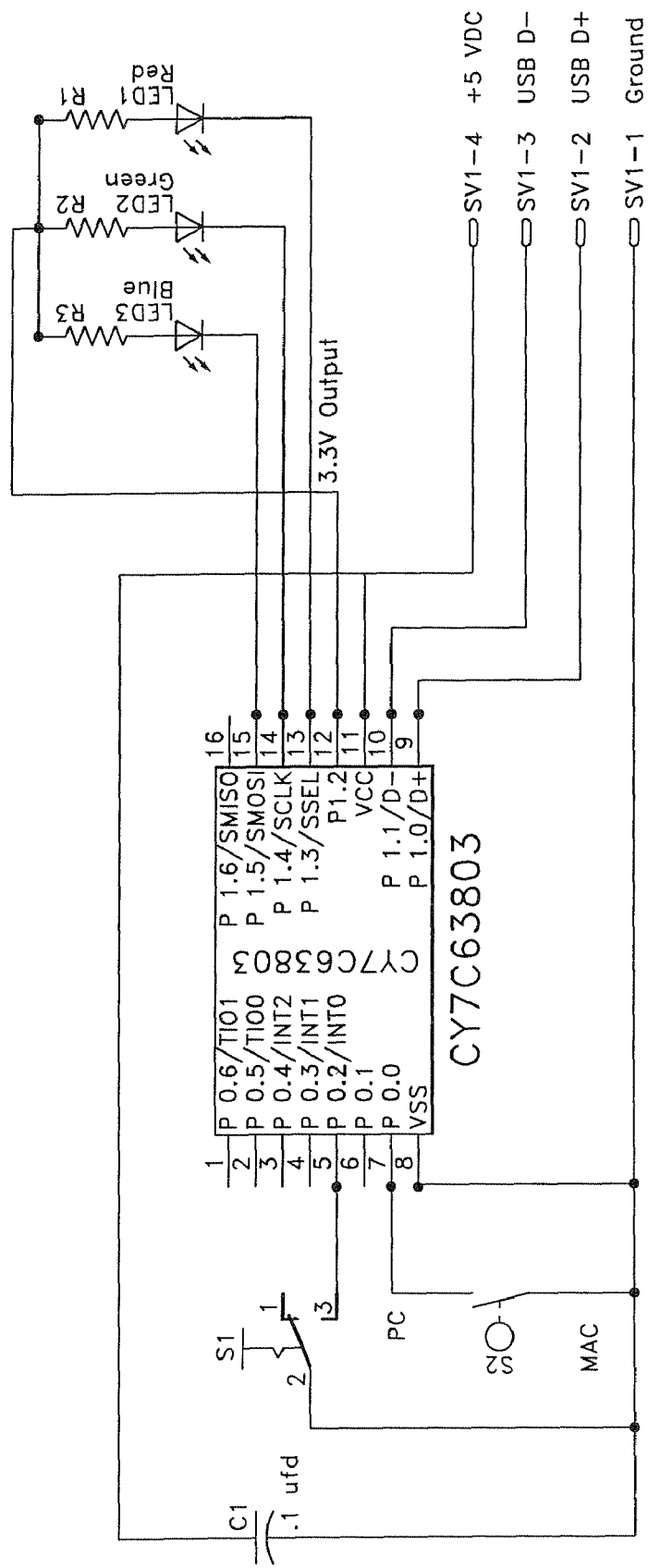
FIG. 3 is an electrical schematic for an example control circuit including a microcontroller IC in the USB web launcher of FIG. 1.

A first exemplary embodiment of a USB web launcher 10 according to the present invention, shown in FIGS. 1 and 2, has a housing 12 connected to a USB plug 14 by a cable 16. The housing in this embodiment has a generally circular base 18 and a dome 20 which is vertically movable with respect to the base so as to act as a pushbutton cap. The dome lies over and is mechanically connected to a momentary switch S1 which, as shown in FIG. 3, is electrically connected to a microcontroller, e.g., a Cypress Semiconductor CY7C63803 USB microcontroller as one example of a controller which is suitable for use in the present invention. Other microcontrollers in the Cypress enCoRe™ II family of microcontrollers may also be used, as may other integrated circuits with similar functionality. Switch S1 is connected to a control input of the microcontroller so as to trigger the operation of a web launch program stored therein, as described below.

Momentary switch S1 is preferably spring-biased in the open position and has its normally open contact connected to pin 5 of the IC as shown. In addition, the dome is preferably spring-biased away from the switch such that it normally applies no pressure against the switch. For example, the embodiment of FIG. 1 has three circumferentially spaced compression springs between an upper surface of the base and the underside of the dome. Pressing on the dome closes the switch and grounds pin 5. The dome is partially constrained laterally and vertically on the base such that it floats to a limited degree and is capable of omnidirectional rocking or tilting with respect to the base. As will be described, one or more switches may be employed in addition to switch S1, e.g., for accessing different websites.

As shown in FIG. 3, the microcontroller has one input connected to switch S1, another input connected to a PC/MAC selection switch S2, and three outputs connected to respective LEDs 1, 2 and 3 which, in this embodiment, are red, green and blue LEDs, respectively. The microcontroller supplies current to the LEDs in response to a trigger signal from switch S1 and in accordance with the web launch program, through respective current-limiting resistors as shown in the schematic. The microcontroller has two data pins connected to two corresponding data pins of USB plug 14 which, in normal use of the device as a web launcher, is connected to a mating USB port of a host computer (not shown) and thereby provides a two-way means of communication between the microcontroller and the host computer. USB plug 14 is also used to supply power to the web launch circuit, which may also include a filter capacitor C1 on the power supply lines as shown.

The microcontroller has stored therein, e.g., in internal flash memory, one or more website addresses, i.e., URLs, which may be accessed upon actuation of USB web launcher 10. Each URL has been converted to its corresponding keyboard scancodes so that the USB web launcher can send the URL string to the host computer with no conversions necessary. The following is one example of a URL and its corresponding scancode string:

Sample URL: http://www.RJGinc.com

Corresponding scancode string:

```
start                     shift
flag           shift      cancel                                              shift
 |              |          |                                                   |
 |     h  t  t  p   |   :  |   /  /  w  w  w   .                               |
0x01, 0x0B, 0x17, 0x17, 0x13, 0x02, 0x33, 0xFF, 0x54, 0x54, 0x1A, 0x1A, 0x1A, 0x37, 0x02, end
         shift                          carriage   shift    of
         cancel                         return     cancel   data
           |                              |         |        |
  R  J  G  |   i  n  c  .  c  o  m        |         |        |
0x15, 0x0D, 0x0A, 0xFF, 0x0C, 0x11, 0x06, 0x37, 0x06, 0x12, 0x10, 0x28, 0xFF, 0x00
```

In this example, for C source code compatibility, the 00 value for the "cancel" code (the scancode indicating the release of a key) is coded as FF in the scancode string as stored in controller memory. The controller is accordingly programmed to convert the FF value to a 00 value in the process of sending the scancode string to the host.

Figure 5:
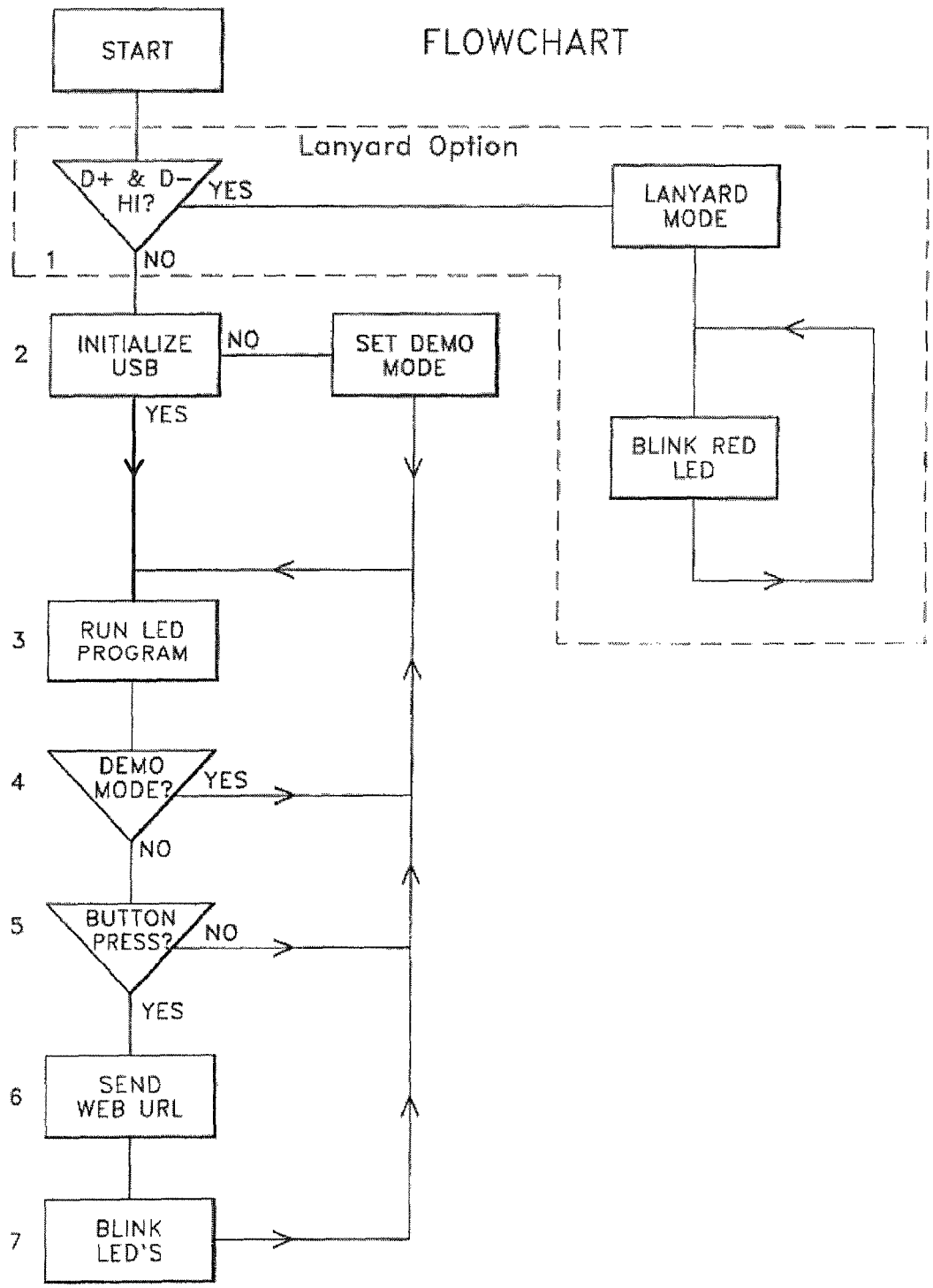
FIG. 5 is a flowchart of the controller software for the USB web launcher of FIG. 1.

FIG. 5 is a flowchart of the software stored within the controller. The program starts upon power-up, and as a first step checks the initial status of the data lines. In one embodiment, if the data lines are both high, the device operates in a lanyard mode as will be described below. For normal use of the device as a web launcher, with the device connected to a host computer's USB port, one or the other of the data lines is initially high, indicating to the host whether the device is a low-speed or high-speed USB device, and the program proceeds, in step 2, to initialize the USB connection. Upon detection of the new hardware connected to the USB port, the host initiates enumeration, or recognition, of the detected device, requesting identification data beginning with a Device Descriptor in accordance with the Universal Serial Bus Specification Revision 2.0 and the USB Device Class Definition for Human Interface Devices (HID Specification), which specifications are hereby incorporated by reference. The device descriptor may include, inter alia, the USB version, class, subclass, protocol, maximum packet size, vendor ID, product ID, and serial number.

The host computer also requests, and the HID responds by sending, additional descriptors including a Configuration Descriptor and its subordinate descriptors which may include one or more Interface Descriptors, HID Descriptors, and Endpoint Descriptors, in accordance with the above-referenced USB Specification and HID Specification. An example handshaking data stream for one preferred embodiment of the present invention is included in the attached Appendix A. An interface descriptor, comprising bytes 10 through 18 of the control transfer (up) of step 6 in the Appendix, contains a class code (03) indicating that the device is configured to operate as an HID, a subclass code (01) indicating that the device has a boot interface, and a protocol code (01) identifying the HID as a keyboard. In the preferred embodiment, the device also sends the host an HID Report Descriptor (see steps 22 and 23 in the Appendix) which indicates that the HID operates as a keyboard. The host computer processes the information contained in the retrieved descriptors and loads a device driver or drivers, as appropriate and available from its operating system, to manage communications with the device.

Step 2 of the flowchart of FIG. 5 also indicates that initialization is aborted if a USB signal is not detected, in which case the device enters a demo mode in which the device is unresponsive to button presses. In either case the program proceeds to step 3, in which the controller executes a program controlling actuation of the LEDs.

The controller is preferably programmed to run multiple LED programs, and may be preset for one program and/or may include means for selecting one or more of the available programs, for example, five programs described as follows: Mode 1 fades the red LED on and off in 10 steps. Mode 2 is the same with the green LED, and Mode 3 is the same with the blue LED. Mode 4 is a color wash program which fades the red, green and blue LEDs in sequence. For example, red starts and ramps up in 10 steps. When it is at its maximum brightness, the green LED starts and increases in brightness in 10 steps, as the red LED brightness is decreasing in 10 steps. When green reaches its maximum brightness, the blue LED turns on and goes through the same brightness-changing sequence. This cycle continues until a button press is recognized. Alternatively, all LEDs may be faded up and down simultaneously, with desired color overlap periods and with different cycle frequencies if desired. As another alternative, one or more LEDs may be turned on continuously or with constant intensity at a desired flash rate.

As indicated by step 4 of the flowchart, if the device is in demo mode, the program loops back and repeats the LED program, e.g., defaulting to a color wash pattern. No button presses are recognized. If not in demo mode, the program proceeds to check (step 5) for button presses and, if a button, e.g., switch S1, has been pressed, starts the URL sending sequence (step 6). The controller transmits a string of precalculated and prestored scancodes so that the host sees a fully valid URL and launches the default web browser to the assigned website. The USB driver in the host computer and the microcontroller may exchange handshaking signals to control the data transmission, e.g., the transmission rate. As the web URL is transmitted, or thereafter, the LEDs may execute a blinking sequence (step 7), e.g., all on then all off, 2 times a second, for a total of six times on and off.

The scancodes are preferably in accordance with the USB Specification and transmitted in a character transmission sequence such as the example sequence shown in the attached Appendix B. The disclosed example is for use on a PC with a Microsoft Windows operating system wherein a "Windows" key and the "R" key are pressed together to open the Run box for text input. The sequence includes multiple blocks of eight bytes each to indicate, as appropriate, simultaneous multiple key actuation, e.g., simultaneous use of the Shift key and a letter key as used for an uppercase letter, or simultaneous use of the Windows key and the "R" key as indicated in the first line of the character transmission sequence in Appendix B.

For an Apple Macintosh, or MAC, computer, the URL transmission process begins with the transmission of a similar code which is effective to invoke the URL command line of an open browser. Switch S2 in FIG. 3 is for selection of the type of computer with which the web launcher is to be used, e.g., a PC or a MAC, and it may be implemented as a DIP switch or a slide switch, for example, either as an internal switch or as a user-actuated switch on the underside of the base. In certain applications, identification of the HID device as an Apple keyboard, e.g., in one of its descriptors, may suffice to make it operable on either a PC or a MAC, with the controller appropriately programmed to operate without the selection switch.

Figure 6:
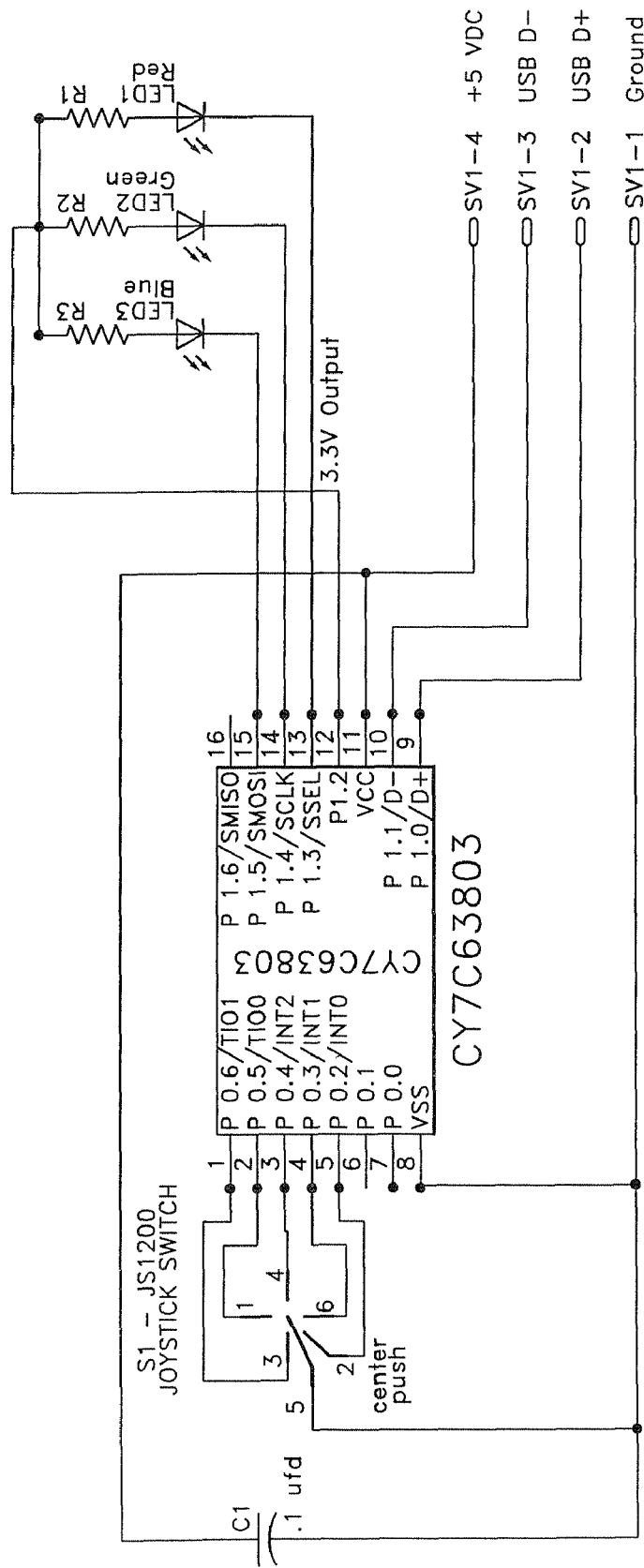
FIG. 6 is a schematic for a control circuit in a joystick-based alternative embodiment of a USB web launcher according to the present invention.

One or more switches may be employed in addition to switch S1 for accessing different websites. For example, four peripheral switches may be equally circumferentially spaced on the base so as to sense north, south, east or west pushbutton action. Alternatively, a joystick or other multi-position switch may be provided to provide multi-directional sensing and corresponding website selection. A JS1200 joystick from E-Switch, with four polar contacts and a center push contact, is one example of such a multi-directional switch. Referring to FIG. 6, the switch common is connected to ground and the center contact and four polar contacts are connected to respective inputs of the microcontroller, which is programmed to recognize a low logic level on any one of those inputs as a selection of a corresponding one of five URLs stored in its internal memory and to send the selected URL to the host computer in accordance with the microcontroller's operating program described above.

Instead of or in addition to a multi-directional switch as just described, the controller may be further programmed to recognize and respond to different switch closure times. For example, the controller may be programmed to send one URL in response to a tap of a given switch, and to send a different URL in response to sustained closure of the switch, e.g., pressing on the dome for longer than a predetermined time such as 1½ to 2 seconds, or in response to a double tap of the switch.

Figure 4:
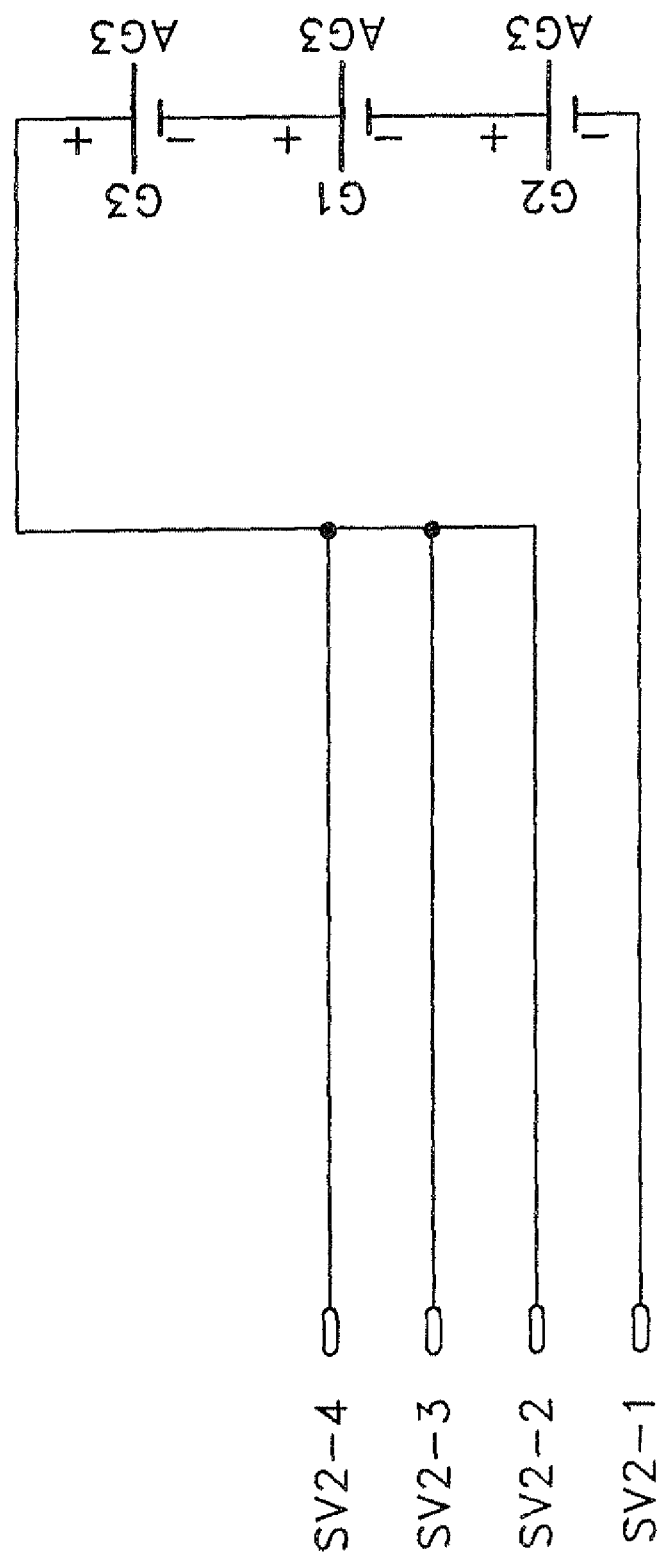
FIG. 4 is an electrical schematic for a circuit optionally provided in the USB web launcher of FIG. 1 for a lanyard embodiment of the present invention.
Figure 7:
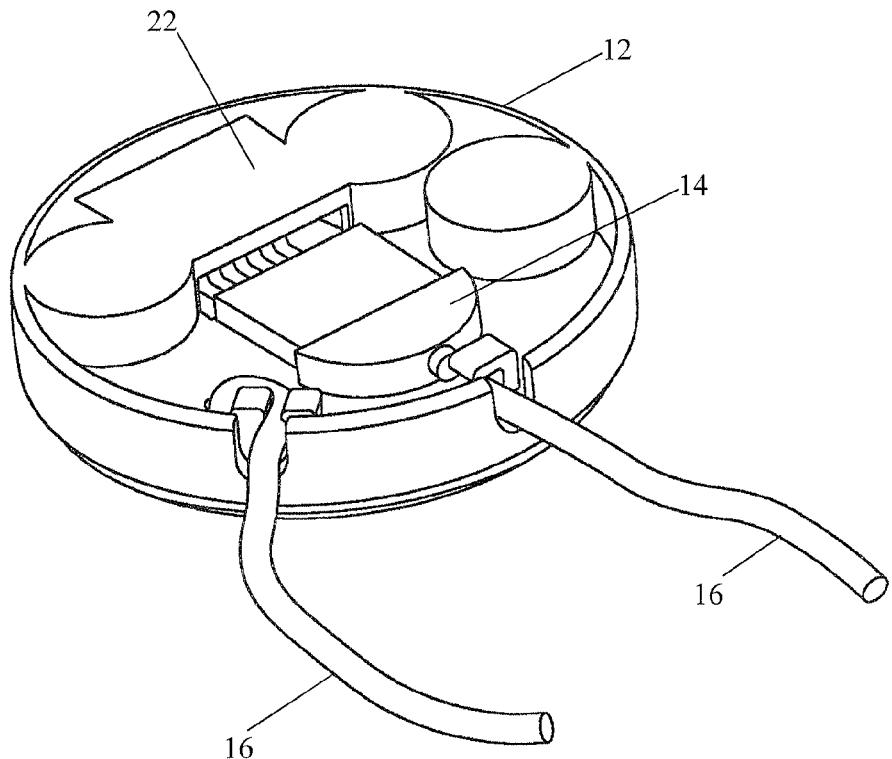
FIGS. 7 and 8 illustrate a lanyard embodiment of the present invention.
Figure 8:
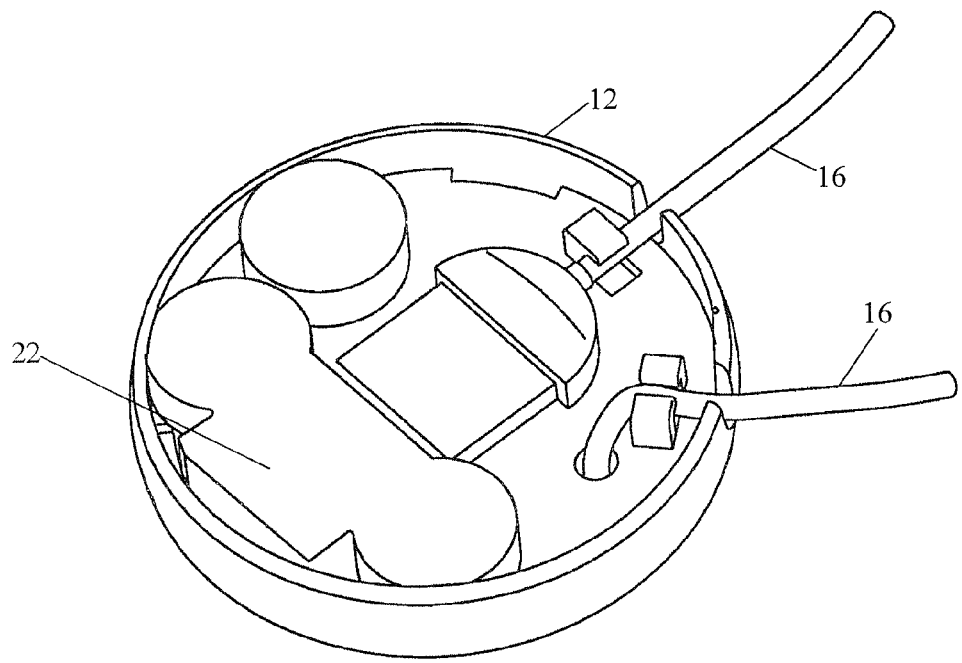

FIGS. 7 and 8 illustrate a lanyard embodiment, i.e., an embodiment of the invention in which the web launch device is adapted to be worn or carried as a lanyard when not in use as a web launcher. For this purpose the device may be provided with a bottom side receptacle 22 to receive plug 14, and cable 16 is made long enough to go around a human neck. Referring also to FIGS. 3-5, the receptacle has four pins electrically connected to a battery power source, preferably three AG3 non-rechargeable batteries in series as shown in FIG. 4. The controller is programmed to detect when plug 14 is plugged into receptacle 22 instead of into a USB port of a host computer, and in that event the device operates in the lanyard mode. As indicated in the flowchart, the program causes an LED, e.g., the red LED, to blink repeatedly when in lanyard mode. Other light effects are contemplated as alternatives, including the various LED programs described above.

In the disclosed embodiment, pins 2 and 3 of the receptacle are connected to the positive battery terminal, whereby, with plug 14 plugged into receptacle 22, the batteries provide power to the circuit and also pull both data pins (D+ and D−) high on the microcontroller, which is programmed to respond by causing the device to operate in the lanyard mode. Alternatively, the microcontroller may be programmed to enter lanyard mode in response to different logic levels on the data lines, such as a high level on the D− line and a low level on the D+ line, with the receptacle wired accordingly. If the criteria for the lanyard mode are not met but there is no activity on the data lines, e.g., no incoming descriptor request from a host computer, the program goes into demo mode and, e.g., a predetermined color wash pattern.

The lanyard option is particularly desirable for a web launcher used as a promotional item. For example, a company may have such web launch lanyards preprogrammed with the URL for its company website, and a sales representative at a trade show or otherwise may give one of the devices to a potential customer who may wear the device as flashing ornament for a period of time and then use it later to connect to the company's website with minimal effort.

While the invention has been illustrated and described in detail in the drawings and foregoing description, the same is to be considered as illustrative and not restrictive in character, it being understood that only preferred embodiments have been shown and described and that all changes and modifications that come within the spirit of the invention are desired to be protected. For example, a wireless USB connection to a host computer is also contemplated.

APPEDIX A

USB Initialization

```
000000: PnP Event: Device Connected (UP)
The USB device has just been connected to the system.
000001: Get Descriptor Request (DOWN)
Descriptor Type: Device
Descriptor Index: 0x0
Transfer Buffer Size: 0x12 bytes
000002: Control Transfer (UP)
Pipe Handle: 0x876eee38
    12 01 00 02 00 00 00 08 B4 04 0D 12 00 01 01 02     ........'......
    00 01                                               ..
Setup Packet
    80 06 00 01 00 00 12 00                             □.......
Recipient: Device
Request Type: Standard
Direction: Device->Host
Request: 0x6 (GET_DESCRIPTOR)
Value: 0x100
Index: 0x0
Length: 0x12
000003: Get Descriptor Request (DOWN)
Descriptor Type: Configuration
Descriptor Index: 0x0
Transfer Buffer Size: 0x9 bytes
000004: Control Transfer (UP)
Pipe Handle: 0x876eee38
    09 02 3B 00 02 01 00 A0 32                          ..;.... 2
Setup Packet
    80 06 00 02 00 00 09 00                             ........
Recipient: Device
Request Type: Standard
Direction: Device->Host
Request: 0x6 (GET_DESCRIPTOR)
Value: 0x200
Index: 0x0
Length: 0x9
000005: Get Descriptor Request (DOWN)
Descriptor Type: Configuration
Descriptor Index: 0x0
Transfer Buffer Size: 0x3b bytes
000006: Control Transfer (UP)
Pipe Handle: 0x876eee38
    09 02 3B 00 02 01 00 A0 32 09 04 00 00 01 03 01     ..;.... 2.......
    01 00 09 21 11 01 00 01 22 3F 00 07 05 81 03 08     ...!...."?......
    00 0A 09 04 01 00 01 03 00 00 00 09 21 11 01 00     ............!...
    01 22 34 00 07 05 82 03 08 00 0A                    ."4...□....
```

-continued

```
Setup Packet
    80 06 00 02 00 00 3B 00                          ......;.
Recipient: Device
Request Type: standard
Direction: Device->Host
Request: 0x6 (GET_DESCRIPTOR)
Value: 0x200
Index: 0x0
Length: 0x3b
000007: Select configuration (DOWN)
Configuration Index: 1
000009: Select configuration (UP)
Configuration Index: 1
Configuration Handle: 0x8871f430
000012: PnP Event: Query ID (UP)
Device ID: USB\Vid_04b4&Pid_120d
000013: PnP Event: Query Device Text (UP)
Description: enCoReII Keyboard RDK
000014: PnP Event: Query Device Text (UP)
Location: enCoReII Keyboard RDK
000015: PnP Event: Query ID (UP)
Hardware IDs: USB\Vid_04b4&Pid_120d&Rev_0100,
USB\Vid_04b4&Pid_120d
000016: PnP Event: Query ID (UP)
Device ID: USB\Vid_04b4&Pid_120d
000017: PnP Event: Query Device Text (UP)
Description: enCoReII Keyboard RDK
000018: PnP Event: Query Device Text (UP)
Location: enCoReII Keyboard RDK
000019: PnP Event: Query ID (UP)
Hardware IDs: USB\Vid_04b4&Pid_120d&Rev_0100,
USB\Vid_04b4&Pid_120d
000020: Class-Specific Request (DOWN)
Destination: Interface, Index 0
Reserved Bits: 34
Request: 0xa
Value: 0x0
Send 0x0 bytes to the device
000021: Control Transfer (UP)
Pipe Handle: 0x876eee38
Setup Packet
    21 0A 00 00 00 00 00 00                          !.......
Recipient: Interface
Request Type: Class
Direction: Host->Device
Request: 0xa (Unknown)
Value: 0x0
Index: 0x0
Length: 0x0
000022: Get Descriptor Request (DOWN)
Descriptor Type: HID Report Descriptor
Descriptor Index: 0x0
Transfer Buffer size: 0x7f bytes
000023: Control Transfer (UP)
Pipe Handle: 0x876eee38
    05 01 09 06 A1 01 05 07 19 E0 29 E7 15 00 25 01   ....i...à)ç..%.
    75 01 95 08 81 02 95 01 75 08 81 01 95 05 75 01   u..i...u.)...u.
    05 08 19 01 29 05 91 02 95 01 75 03 91 01 95 06   ....)...u.u...u.
    75 08 15 00 25 65 05 07 19 00 29 65 81 00 C0      u...%e....)e□.À
Setup Packet
    81 06 00 22 00 00 7F 00                          !.."....
Recipient: Interface
Request Type: Standard
Direction: Device->Host
Request: 0x6 (GET_DESCRIPTOR)
Value: 0x2200
Index: 0x0
Length: 0x7f
000024: PnP Event: Query ID (UP)
Device ID: USB\Vid_04b4&Pid_120d
000025: PnP Event: Query ID (UP)
Hardware IDs: USB\Vid_04b4&Pid_120d&Rev_0100,
USB\Vid_04b4&Pid_120d
000026: Class-Specific Request (DOWN)
Destination: Interface, Index 1
Reserved Bits: 34
Request: 0xa
Value: 0x0
Send 0x0 bytes to the device
000027: Control Transfer (UP)
Pipe Handle: 0x876eee38
Setup Packet
    21 0A 00 00 01 00 00 00                          !.......
Recipient: Interface
Request Type: Class
Direction: Host->Device
Request: 0xa (Unknown)
Value: 0x0
Index: 0x1
Length: 0x0
000028: Get Descriptor Request (DOWN)
Descriptor Type: HID Report Descriptor
Descriptor Index: 0x0
Transfer Buffer Size: 0x74 bytes
000029: Control Transfer (UP)
Pipe Handle: 0x876eee38
    05 0C 09 01 A1 01 85 01 19 00 2A 3C 02 15 00 26   ....i.□...*<...&
    3C 02 95 01 75 10 81 00 C0 05 01 09 80 A1 01 85   <...u.□.À....i.&
    02 19 81 29 83 15 00 25 01 75 01 95 03 81 02 95   ...)u..%.u...i.&
    05 81 01 C0                                      .e.À
Setup Packet
    81 06 00 22 01 00 74 00                          !..."..t.
Recipient: Interface
Request Type: Standard
Direction: Device->Host
Request: 0x6 (GET_DESCRIPTOR)
Value: 0x2200
Index: 0x1
Length: 0x74
000030: PnP Event: Query ID (UP)
Device ID: USB\Vid_04b4&Pid_120d
000031: PnP Event: Query ID (UP)
Hardware IDs: USB\Vid_04b4&Pid_120d&Rev_0100,
USB\Vid_04b4&Pid_120d
000032: PnP Event: Query ID (UP)
Device ID: USB\Vid_04b4&Pid_120d
000033: PnP Event: Query ID (UP)
Hardware IDs: USB\Vid_04b4&Pid_120d&Rev_0100,
USB\Vid_04b4&Pid_120d
000034: Bulk or Interrupt Transfer (DOWN)
Pipe Handle: 0x8696927c (Endpoint Address: 0x81)
Get 0x8 bytes from the device
000035: Bulk or Interrupt Transfer (DOWN)
Pipe Handle: 0x8696927c (Endpoint Address: 0x81)
Get 0x8 bytes from the device
000036: Bulk or Interrupt Transfer (DOWN)
Pipe Handle: 0x86ad98ec (Endpoint Address: 0x82)
Get 0x3 bytes from the device
000037: Bulk or Interrupt Transfer (DOWN)
Pipe Handle: 0x86ad98ec (Endpoint Address: 0x82)
Get 0x3 bytes from the device
```

APPENDIX B

Character Transmission Sequence

```
All 2 digit values are hex. "//" separates data from comment.
 08   00   15   00   00   00   00   00  // 08 is Windows key, 15 is R key,
                                              8 bytes total
 00   00   00   00   00   00   00   00  // send packet of 8 0x00 bytes
pause for 250 ms.
 00   00   0B   00   00   00   00   00  // 0B is for "h" character
 00   00   00   00   00   00   00   00  // send packet of 8 0x00 bytes
 00   00   17   00   00   00   00   00  // 17 is for "t" character
 00   00   00   00   00   00   00   00  // send packet of 8 0x00 bytes
 00   00   17   00   00   00   00   00  // 17 is for "t" character
 00   00   00   00   00   00   00   00  // send packet of 8 0x00 bytes
 00   00   13   00   00   00   00   00  // 13 is for "p" character
 00   00   00   00   00   00   00   00  // send packet of 8 0x00 bytes
 02   00   00   00   00   00   00   00  // 02 is shift key code
 02   00   33   00   00   00   00   00  // 02 shift 33 = ":" character
```

-continued

```
02  00  00  00  00  00  00  00  // 02 shift code + 7 0x00 bytes
00  00  00  00  00  00  00  00  // send packet of 8 0x00 bytes to
                                    cancel shift mode
00  00  54  00  00  00  00  00  // 54 is for "/" character on
                                    numeric keypad
00  00  00  00  00  00  00  00  // send packet of 8 0x00 bytes
00  00  54  00  00  00  00  00  // 54 is for "/" character on
                                    numeric keypad
00  00  00  00  00  00  00  00  // send packet of 8 0x00 bytes
00  00  1A  00  00  00  00  00  // 1A is for "w" character
00  00  00  00  00  00  00  00  // send packet of 8 0x00 bytes
00  00  1A  00  00  00  00  00  // 1A is for "w" character
00  00  00  00  00  00  00  00  // send packet of 8 0x00 bytes
00  00  1A  00  00  00  00  00  // 1A is for "w" character
00  00  00  00  00  00  00  00  // send packet of 8 0x00 bytes
00  00  37  00  00  00  00  00  // 37 is for "." character
00  00  00  00  00  00  00  00  // send packet of 8 0x00 bytes
02  00  00  00  00  00  00  00  // 02 is shift key code
02  00  15  00  00  00  00  00  // 02 shift 15 = "R"
02  00  00  00  00  00  00  00  // 02 shift code + 7 0x00 bytes
02  00  0D  00  00  00  00  00  // 02 shift 0D = "J"
02  00  00  00  00  00  00  00  // 02 shift code + 7 0x00 bytes
02  00  0A  00  00  00  00  00  // 02 shift 0A = "G"
02  00  00  00  00  00  00  00  // 02 shift code + 7 0x00 bytes
00  00  00  00  00  00  00  00  // send packet of 8 0x00 bytes to
                                    cancel shift mode
00  00  0C  00  00  00  00  00  // 0C is for "i" character
00  00  00  00  00  00  00  00  // send packet of 8 0x00 bytes
00  00  11  00  00  00  00  00  // 11 is for "n" character
00  00  00  00  00  00  00  00  // send packet of 8 0x00 bytes
00  00  06  00  00  00  00  00  // 06 is for "c" character
00  00  00  00  00  00  00  00  // send packet of 8 0x00 bytes
00  00  37  00  00  00  00  00  // 37 is for "." character
00  00  00  00  00  00  00  00  // send packet of 8 0x00 bytes
00  00  06  00  00  00  00  00  // 06 is for "c" character
00  00  00  00  00  00  00  00  // send packet of 8 0x00 bytes
00  00  12  00  00  00  00  00  // 12 is for "o" character
00  00  00  00  00  00  00  00  // send packet of 8 0x00 bytes
00  00  10  00  00  00  00  00  // 10 is for "m" character
00  00  00  00  00  00  00  00  // send packet of 8 0x00 bytes
00  00  28  00  00  00  00  00  // 28 is for <carriage return>
00  00  00  00  00  00  00  00  // send packet of 8 0x00 bytes
00  00  00  00  00  00  00  00  // send packet of 8 0x00 bytes
                                    <end of transmission>
```

We claim:

1. A universal serial bus (USB) web launcher for launching a browser on a host computer and directing the browser to a website specified by the web launcher, comprising:
   a housing;
   a controller within said housing having a uniform resource locator (URL) stored therein;
   an internal battery in said housing;
   USB connector means for coupling said controller to a USB port of the host computer, said USB connector means including a first USB connector and a cable, said cable interconnecting said first USB connector and said controller;
   a second USB connector complementary to said first USB connector, and independently connected to said internal battery;
   a light-emitting diode (LED); and
   a manual switch mounted on said housing and electrically connected to an input of said controller;
   said web launcher being configured to electrically connect said internal battery to said controller when said first and second USB connectors are connected to each other, and to otherwise disconnect said internal battery from said controller;
   said controller being configured to send the stored URL to the host computer in response to actuation of said manual switch, whereby the host computer launches the browser and accesses the corresponding website,
   wherein said controller is programmed to detect when said complementary first and second USB connectors are connected to each other and to energize said LED in response.

2. The USB web launcher of claim 1, wherein said controller has a URL stored therein in the form of a keyboard scancode string and is programmed to send the scancode string to the host computer in response to actuation of said manual switch.

3. The USB web launcher of claim 2, wherein said controller is configured to operate as a USB human interface device (HID) class device.

4. The USB web launcher of claim 3, wherein said controller has a plurality of distinct URLs stored therein, each in the form of a keyboard scancode string.

5. The USB web launcher of claim 4, wherein said switch is a multi-function switch having first and second switch functions respectively associated with first and second ones of said URLs.

6. The USB web launcher of claim 5, wherein said housing has a generally circular base and a generally circular dome portion mounted on said base.

7. The USB web launcher of claim 1, wherein said internal battery is a non-rechargeable battery electrically connected to said second USB connector, and electrically connected to said controller only through the interconnection of said first and second USB connectors.

8. The USB web launcher of claim 1, wherein, when said first and second USB connectors are connected to each other, said internal battery is connected to said controller through said first and second USB connectors and said cable.

9. A universal serial bus (USB) web launcher for launching a browser on a host computer and directing the browser to a website specified by the web launcher, comprising:
   a housing;
   a controller within said housing having a uniform resource locator (URL) stored therein;
   an internal battery in said housing;
   USB connector means for coupling said controller to a USB port of the host computer, said USB connector means including a first USB connector and a cable, said cable interconnecting said first USB connector and said controller;
   a second USB connector complementary to said first USB connector, and independently connected to said internal battery;
   a light-emitting diode (LED); and
   a manual switch mounted on said housing and electrically connected to an input of said controller;
   said web launcher being configured to supply power from the internal battery to the LED when the first and second USB connectors are connected to each other, and to otherwise electrically disconnect the internal battery from the LED;
   said controller being configured to send the stored URL to the host computer in response to actuation of said manual switch, whereby the host computer launches the browser and accesses the corresponding website.

10. The USB web launcher of claim 9, wherein said controller has a URL stored therein in the form of a keyboard scancode string and is programmed to send the scancode string to the host computer in response to actuation of said manual switch.

11. The USB web launcher of claim 10, wherein said controller is configured to operate as a USB human interface device (HID) class device.

12. The USB web launcher of claim 11, wherein said controller has a plurality of distinct URLs stored therein, each in the form of a keyboard scancode string.

13. The USB web launcher of claim 12, wherein said switch is a multi-function switch having first and second switch functions respectively associated with first and second ones of said URLs.

14. The USB web launcher of claim 13, wherein said housing has a generally circular base and a generally circular dome portion mounted on said base.

* * * * *